United States Patent [19]

Werner

[11] 4,422,539
[45] Dec. 27, 1983

[54] CLUTCH DISK

[75] Inventor: Karl-Heinz Werner, Schweinfurt, Fed. Rep. of Germany

[73] Assignee: Fichtel & Sachs AG, Schweinfurt, Fed. Rep. of Germany

[21] Appl. No.: 213,626

[22] Filed: Dec. 5, 1980

[30] Foreign Application Priority Data

Dec. 21, 1979 [DE] Fed. Rep. of Germany ....... 2951573

[51] Int. Cl.³ ............................................. F16D 13/69
[52] U.S. Cl. ................................................. 192/107 C
[58] Field of Search ..................................... 192/107 C

[56] References Cited

U.S. PATENT DOCUMENTS

| 2,207,961 | 7/1940 | Wellman | 192/107 C |
|---|---|---|---|
| 2,309,950 | 2/1943 | Goodwin | 192/107 C |
| 2,448,880 | 9/1948 | Gamble | 192/107 C X |
| 2,521,138 | 9/1950 | Waller | 192/107 C X |
| 3,261,439 | 7/1966 | Binder | 192/107 C |
| 4,260,048 | 4/1981 | Beccaris | 192/107 C |

FOREIGN PATENT DOCUMENTS

| 1233669 | 2/1977 | Fed. Rep. of Germany . | |
|---|---|---|---|
| 1012990 | 12/1965 | United Kingdom . | |
| 1091865 | 11/1967 | United Kingdom . | |
| 1235826 | 6/1971 | United Kingdom ............ | 192/107 C |
| 1465913 | 3/1977 | United Kingdom . | |

Primary Examiner—Rodney H. Bonck
Attorney, Agent, or Firm—Toren, McGeady and Stanger

[57] ABSTRACT

In a clutch disk, particularly for a motor vehicle clutch, the annular friction linings are mounted on a carrier disk by a plurality of pairs of leaf spring elements which are distributed along a peripheral zone of the carrier disk. The leaf spring elements comprise fixing portions. The fixing portions of the leaf spring elements of respective pairs of leaf spring elements rest against each other and are commonly fixed to the peripheral zone. Further the leaf spring elements comprise lining carrying portions, which are fixed to the friction linings. The lining carrying portions of the leaf spring elements of respective pairs of leaf spring elements have an uneven configuration such that only first partial areas of the lining carrying portions abut each other, whereas second partial areas of the lining carrying portions are spaced from each other in axial direction when in the unloaded condition. The lining carrying portion and the fixing portion of at least one of the leaf spring elements of respective pairs of leaf spring elements are inclined with respect to each other in the disassembled condition; in the assembled condition this inclination is overcome so as to elastically press the lining carrying portions against each other in the first partial areas.

6 Claims, 9 Drawing Figures

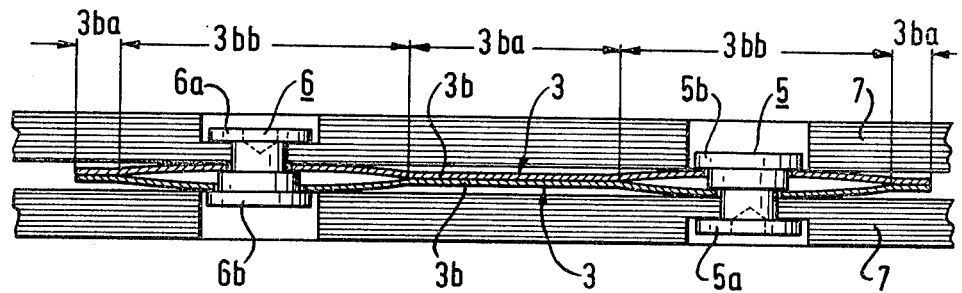
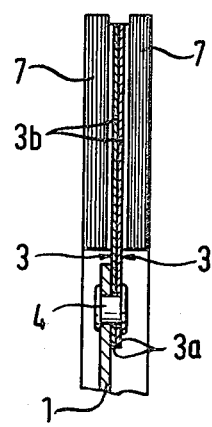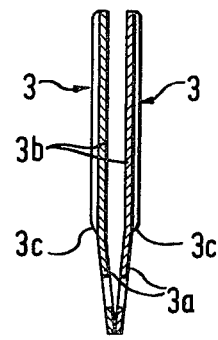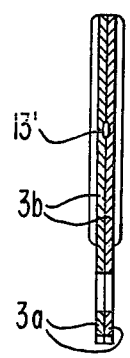
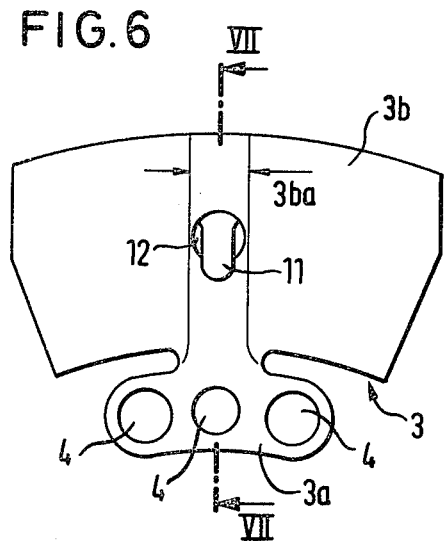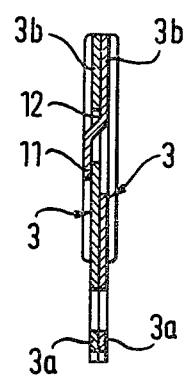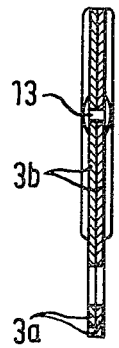

CLUTCH DISK

SUMMARY OF THE INVENTION

The present invention is directed to a clutch disk, particularly for a motor vehicle clutch. The clutch disk comprises a carrier disk having an axis and a peripheral zone. Annular friction linings are fixed to said peripheral zone by a plurality of pairs of leaf spring elements, which are distributed along and fixed to said peripheral zone. The leaf spring elements of respective pairs of leaf spring elements comprise a radially inner fixing portion and a radially outer lining carrying portion. The fixing portion of said leaf spring elements of respective pairs of leaf spring elements rest against each other in axial direction and are commonly fixed to said peripheral zone. At least one of said lining carrying portions of said leaf spring elements of respective pairs of leaf spring elements has an uneven configuration as compared with a plane normal to said axis such that only first partial areas of said lining carrying portions abut each other, whereas second partial areas of said lining carrying portions are spaced from each other in axial direction when the clutch disk is in the unloaded condition. The annular friction linings are fixed to oppositely directed front faces of said lining carrying portions of the leaf spring elements of respective pairs of leaf spring elements within said second partial areas.

Such a clutch disk is known from German Auslegeschrift 1 233 669.

In the known construction there is a risk of deformation of the leaf spring elements. If such deformation occurs the following problem arises: The clutch disks of the type considered are to be used between clutch faces of a clutch assembly. The clutch faces are axially movable with respect to each other. When the clutch assembly is engaged the clutch faces rest against the annular linings under axial pressure. When the clutch assembly is to be disengaged, the clutch faces are removed from each other in axial direction for a predetermined clutch disengagement stroke. The width of the clutch disengagement stroke becomes smaller and smaller in modern high torque clutch assemblies. If the clutch disks of the known type are deformed by deformation of the leaf spring elements the annular linings remain in frictional contact with the clutch faces, even when the clutch faces are removed from each other to the full axial clutch disengagement stroke. This is highly undesirable because the expensive linings are worn in operation. In order to avoid such deformations of the clutch disks and in particular of the lining—leaf spring element-group thereof—, it is an object of the invention to stabilize the leaf spring elements against undesirable deformation with respect to the plane of the clutch disk.

In accordance with the present invention the lining carrying portion and the fixing portion of at least one of the leaf spring elements of respective pairs of leaf spring elements are inclined with respect to each other—as seen in a section plane containing said axis of the disk—in the disassembled condition, said inclination being at least partially overcome in the assembled condition so as to elastically press said lining carrying portions of the leaf spring elements of respective pairs of leaf spring elements against each other in said first partial areas.

It has been found that by using the design according to this invention the stability of the clutch faces against deformation with respect to the clutch disk plane has been considerably improved, so that even after a long range of operation under rough conditions, a complete disengagement of the associated clutch disk assembly is possible.

Another feature of this invention in view of increasing the stability of the clutch disk is that said lining carrying portions of said leaf spring elements of respective pairs of leaf spring elements are interconnected in said first partial areas by interconnection means. These interconnection means may be defined by rivets or by welding junctions or by adhesive junctions.

According to a further embodiment the interconnection means are defined by at least one cranked tongue, which is stamped out from a first partial area of the lining carrying portion of one leaf spring element of respective pairs of leaf spring elements. The free end of said cranked tongue passes through an aperture of an adjacent first partial area of the lining carrying portion of the other leaf spring element of said pairs of leaf spring elements and engages that front face of said other leaf spring element which is remote from said one leaf spring element.

BRIEF DESCRIPTION OF THE DRAWINGS

In the Figures:

FIG. 3 is a sectional view according to line III—III of FIG. 1;

FIG. 4 is a sectional view according to line IV—IV of FIG. 1;

FIG. 5 is a sectional view corresponding to the sectional view of FIG. 4 in the disassembled condition of the leaf spring elements;

FIG. 6 is an axial view of a pair of leaf spring elements according to a modified embodiment of this invention;

FIG. 7 is a sectional view according to line VII—VII of FIG. 6;

FIG. 8 is a sectional view corresponding to the sectional view of FIG. 7 with a further modified embodiment of the invention; and FIG. 9 is a sectional view similar to FIGS. 7 and 8 displaying still another modification of the invention.

In FIGS. 1 and 2 a clutch disk hub is designated by 2. An annular carrier disk 1 is mounted by rivets 20 to a flange portion 21 of said clutch disk hub 2. A plurality of pairs of leaf spring elements 3 are fixed by rivets 4 to the peripheral zone 22 of the carrier disk 1. The leaf spring elements comprise a fixing portion 3a and a lining carrying portion 3b joined by a neck portion. The fixing portions 3a of a pair of leaf spring elements 3 are resting against each other and are fixed to one front face of the carrier disk 1 by the rivets 4 as can be seen from FIGS. 2 and 3. As can be seen from FIGS. 1 and 3, the lining carrying portions 3b of a pair of leaf spring elements 3 rest against each other in the first partial areas 3ba, whereas they are spaced from each other in the second partial areas 3bb. As can be seen from FIG. 3 the friction linings 7 are fixed to the lining carrying portions 3b in the areas 3bb. These friction linings 7 are connected to the lining carrying portions 3b by pulling members 5 and 6. The pulling member 6 fixes by its upper end portion 6a as shown in FIG. 3, the upper friction lining 7 to the lining carrying portion 3b of the upper leaf spring element 3. The lower end portion 6a of the pulling member 6 bears against the downward direction front face of the lining carrying portion 3b of the lower leaf spring element 3. The lower portion 6b of the pulling member 6 is movable with respect to the lining carrying portion 3b of the lower leaf spring element 3. The pulling member 6 is under axial tension so that the lining carrying portions 3b rest against each other under pressure in the partial areas 3ba.

Figure 1:
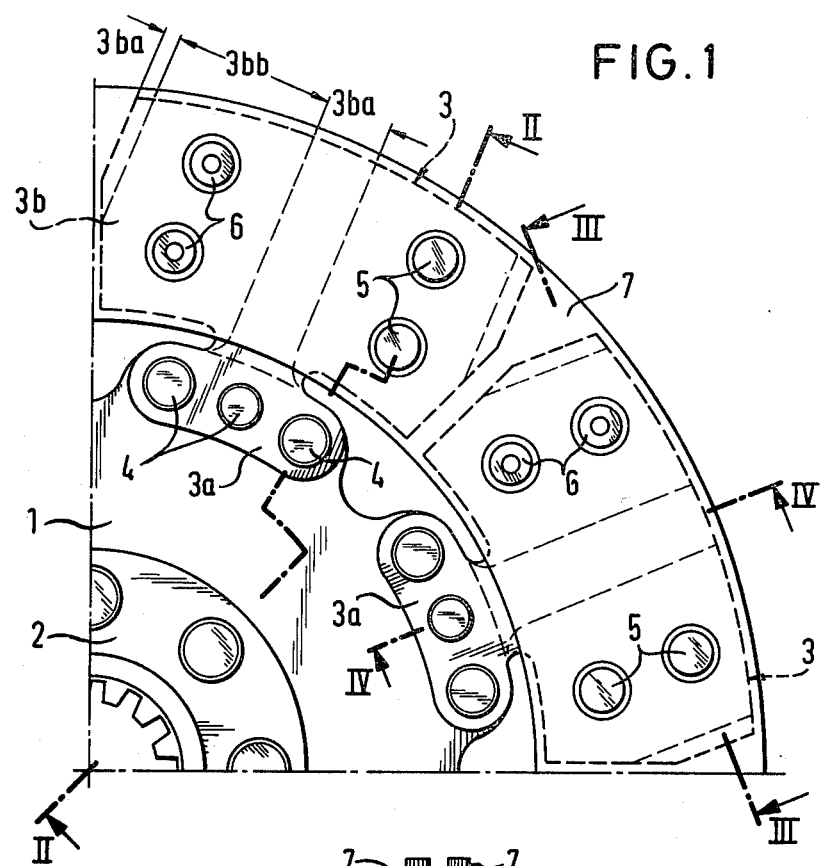
FIG. 1 is a partial axial view of a clutch disk embodying the present invention.
Figure 2:
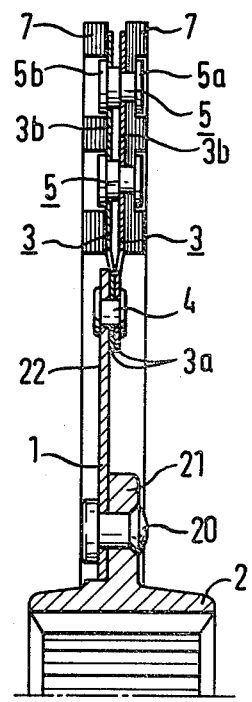
FIG. 2 is a sectional view according to line II—II of FIG. 1.

The pulling member 5 fixes by its lower end portion 5a the lining carrying portion 3b of the lower leaf spring element 3 to the lower friction lining 7. The upper end portion 5b of the pulling member 5 bears against the upward directed front face of the lining carrying portion 3b of the upper leaf spring element 3 and is axially movable with respect to the lining carrying portion 3b of the upper leaf spring element 3. The pulling member 5 is also under axial tension so that the lining carrying portions 3b of the leaf spring elements 3 rest against each other under pressure in the partial areas 3ba.

As can be seen from FIG. 4 the lining carrying portions 3b and the fixing portions 3a are in full contact when mounted to the carrier disk 1 by the rivets 4. When the rivet 4 is, however, removed as can be seen from FIG. 5, the fixing portions 3a are inclined with respect to the lining carrying portions 3b, the bend lines being indicated at 3c. This inclination is overcome when the fixing portions 3a are commonly fixed by the rivets 4 to the carrier disk 1. So an additional pressure is created between the lining carrying portions 3b, when the leaf spring elements 3 are fixed by the rivets 4 to the carrier disk 1.

In the embodiments of FIGS. 6 and 7 one of the lining carrying portions 3b (the right one in FIG. 7) is provided with a cranked tongue 12. This cranked tongue 12 passes through an aperture 11 in the other lining carrying portion 3b (the left one in FIG. 7). The tongue 11 bears with its free end against the left hand lining carrying portion 3b as shown in FIG. 7. It is to be noted that the aperture 12 and the tongue 11 are provided within the first partial area 3ba, in which the lining carrying portions 3b are in full face contact under pressure.

In the embodiment of FIG. 8, the tongue 11—aperture 12 combination of FIGS. 6 and 7 is replaced by a rivet 13. As shown in FIG. 9, the rivet 13 may be replaced by a welding junction or by an adhesive junction. The attachment spot 13' may be provided by a weldment or a deposit of an adhesive material.

While specific embodiments of the invention have been shown and described in detail to illustrate the application of the inventive principles, it will be understood that the invention may be embodied otherwise without departing from such principles.

I claim:

1. In a clutch disk, particularly for a motor vehicle clutch, comprising:
   (a) a carrier disk having an axis, a circumferentially extending radially outer edge, and a peripheral zone spaced radially outwardly from and extending around said axis with said peripheral zone located adjacent to said outer edge of said carrier disk;
   (b) a plurality of pairs of leaf spring elements, said pairs being distributed in the circumferential direction along and fixed to said peripheral zone and extending radially outwardly therefrom;
      (aa) said leaf spring elements of each said pair of leaf spring elements comprising a radially inner fixing portion, a radially outer lining carrying portion and a neck portion connecting said fixing portion and said carrying portion;
      (bb) said fixing portions of said leaf spring elements of each said pair of leaf spring elements having an assembled condition and a disassembled condition and in the assembled condition said leaf spring element of each said pair resting against each other in the axial direction and being commonly fixed to said peripheral zone;
      (cc) the lining carrying portion (3b) of said leaf spring elements (3) of each said pair of leaf spring elements having an uneven configuration as compared with a plane normal to said axis such that only first partial areas of said lining carrying portions abut each other whereas second partial areas of said lining carrying portions are spaced from each other in the axial direction when in the unloaded condition;
   (c) friction linings (7) fixed to oppositely directed front faces of said lining carrying portions of the leaf spring elements of each said pair of leaf spring elements within said second partial areas;
the improvement which consists in that in the disassembled condition the lining carrying portion and the fixing portion of said leaf spring elements of each said pair of leaf spring elements are inclined with respect to each other—as seen in a section plane containing said axis of the disk, said inclination being substantially overcome in the assembled condition so as to elastically press said lining carrying portions of the leaf spring elements of respective pairs of leaf spring elements against each other in said first partial areas, pulling members are provided between said lining carrying portions of the leaf spring elements of each said pair of leaf spring elements in said second partial areas, said pulling members being under pulling tension, said pulling tension generating an additional pressure between said lining carrying portions of the leaf spring elements of respective pairs of leaf spring elements in said first partial areas, said pulling members are formed as rivets fixing said friction linings to said lining carrying portions, one first pulling member fixes by a first end thereof a first friction lining to the lining carrying portion of a first leaf spring element of each said pair of leaf spring elements, a second end of said first pulling member engaging the lining carrying portion of a second leaf spring element of each said pair of leaf spring elements at the outer front face of said second leaf spring element remote from said first leaf spring element and being axially movable with respect to the lining carrying portion of said second leaf spring element, and wherein at least one second pulling member fixes by a first end thereof a second friction lining carrying portion of said second leaf spring element of each said pair of leaf spring elements, the second end of said second pulling member engaging the lining carrying portion of said first leaf spring element of each said pair of leaf spring elements on the outer front face of said first leaf spring element remote from said second leaf spring element and being axially movable with respect to the lining carrying portion of said first leaf spring element, each said lining carrying portion of said leaf spring elements of each said pair of leaf spring elements comprise—when regarded in radial direction with respect to said axis, a centrally arranged said first partial area, and laterally arranged second partial areas on both circumferentially spaced sides of said central first partial area, and laterally arranged said first partial areas on the sides of said lateral second partial areas spaced circumferentially remote from said central first partial area, said lateral second partial areas being substantially arc-shaped, each said lining carrying portion is symmetrical relative to said centrally arranged first partial area thereof.

2. A clutch disk as set forth in claim 1, wherein said lining carrying portions of said leaf spring elements of each said pair of leaf spring elements are interconnected in said first partial areas by interconnection means.

3. A clutch disk as set forth in claim 2, wherein said interconnection means are defined by at least one rivet.

4. A clutch disk as set forth in claim 2, wherein said interconnection means are defined by at least one welding junction.

5. A clutch disk as set forth in claim 2, wherein said interconnection means are defined by at least one cranked tongue stamped out from a first partial area of the lining carrying portion of one leaf spring element of each said pair of leaf spring elements, the free end of said cranked tongue passing through an aperture of a first partial area of the lining carrying portion of the other leaf spring element of each said pair of leaf spring elements and engaging that front face of said other leaf spring element which is remote from said one leaf spring element.

6. A clutch disk as set forth in claim 2, wherein said interconnection means are defined by adhesive means.

* * * * *